United States Patent [19]
Clarke

[11] 4,132,121
[45] Jan. 2, 1979

[54] VARIABLE SPEED DRIVE

[76] Inventor: George C. Clarke, 10509 Penfield Ave., Chatsworth, Calif. 91311

[21] Appl. No.: 791,227

[22] Filed: Apr. 27, 1977

[51] Int. Cl.² .................... F16H 55/56; F16H 55/36
[52] U.S. Cl. ............................ 74/230.17 A; 180/75; 56/11.8
[58] Field of Search .............. 74/230.17 D, 230.17 A, 74/230.17 R, 242.8, 242.9, 242.12, 242.15 R, 497; 56/11.1, 11.8, DIG. 22; 180/70 R, 72, 75

[56] References Cited

U.S. PATENT DOCUMENTS

| | | | |
|---|---|---|---|
| 2,710,069 | 6/1955 | Johnson | 74/242.8 |
| 3,008,338 | 11/1961 | Flanagan et al. | 74/230.17 D |
| 3,015,237 | 1/1962 | Musgrave | 56/11.1 |
| 3,145,584 | 8/1964 | Fairbank et al. | 56/11.1 |
| 3,311,186 | 3/1967 | Kamluckin | 192/13 R |
| 3,457,797 | 7/1969 | Ashton et al. | 74/230.17 |
| 3,470,757 | 10/1969 | Miley | 74/230.17 D |
| 3,477,439 | 11/1969 | Hamouz et al. | 180/70 R |
| 3,494,210 | 2/1970 | Ashton et al. | 74/242.12 |
| 3,515,010 | 6/1970 | Wagstaff et al. | 74/242.15 R |
| 3,575,252 | 4/1971 | Konyhu | 74/217 R |
| 3,583,535 | 6/1971 | Plamper | 180/70 R |
| 3,759,342 | 9/1973 | Plamper | 74/230.17 D |
| 3,777,585 | 12/1973 | Plamper | 74/230.17 D |
| 3,789,684 | 2/1974 | Freier, Jr. | 74/230.17 D |
| 3,824,864 | 7/1974 | Muller | 74/230.17 D |
| 3,903,679 | 9/1975 | Sorenson et al. | 56/11.8 |
| 4,058,957 | 11/1977 | Roseberry | 56/11.8 |

FOREIGN PATENT DOCUMENTS

5400 of 1913 United Kingdom ................... 74/230.17

*Primary Examiner*—Samuel Scott
*Assistant Examiner*—William R. Henderson
*Attorney, Agent, or Firm*—Jenkins, Coffey & Hyland

[57] ABSTRACT

A variable speed drive for a riding lawn mower or the like has a double pulley variable speed sheave assembly coupled between a driving pulley and a driven pulley by first and second V-belts, respectively. A mechanical control linkage is operable to shift the sheave assembly along the cam profile of a cam arm from a stopped position with both belts declutched to a range of low to high speed positions with the belts drivingly engaged. Said control linkage is springably biased to urge the sheave assembly toward the stopped position. The cam arm is also springably biased generally away from the driving and driven pulleys to maintain the belts under driving tension throughout the range of low to high speed positions in a manner such that belt tension varies with variations in operating speed.

34 Claims, 20 Drawing Figures

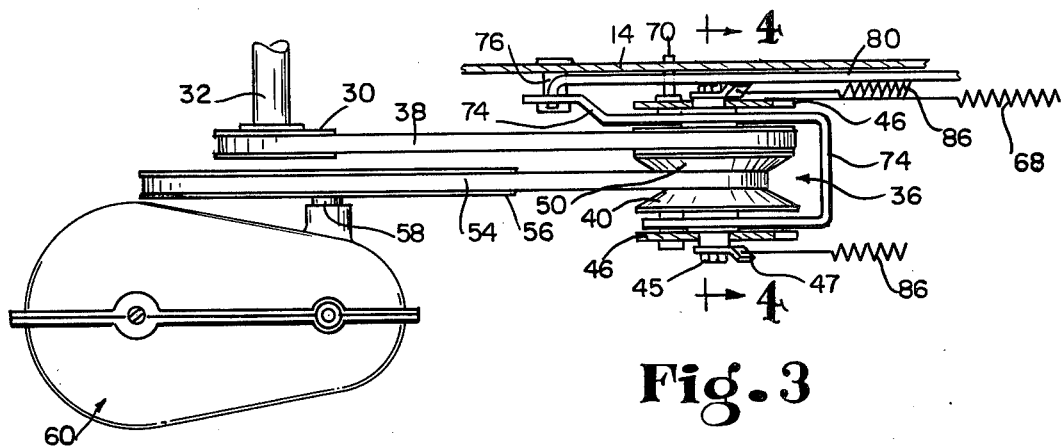
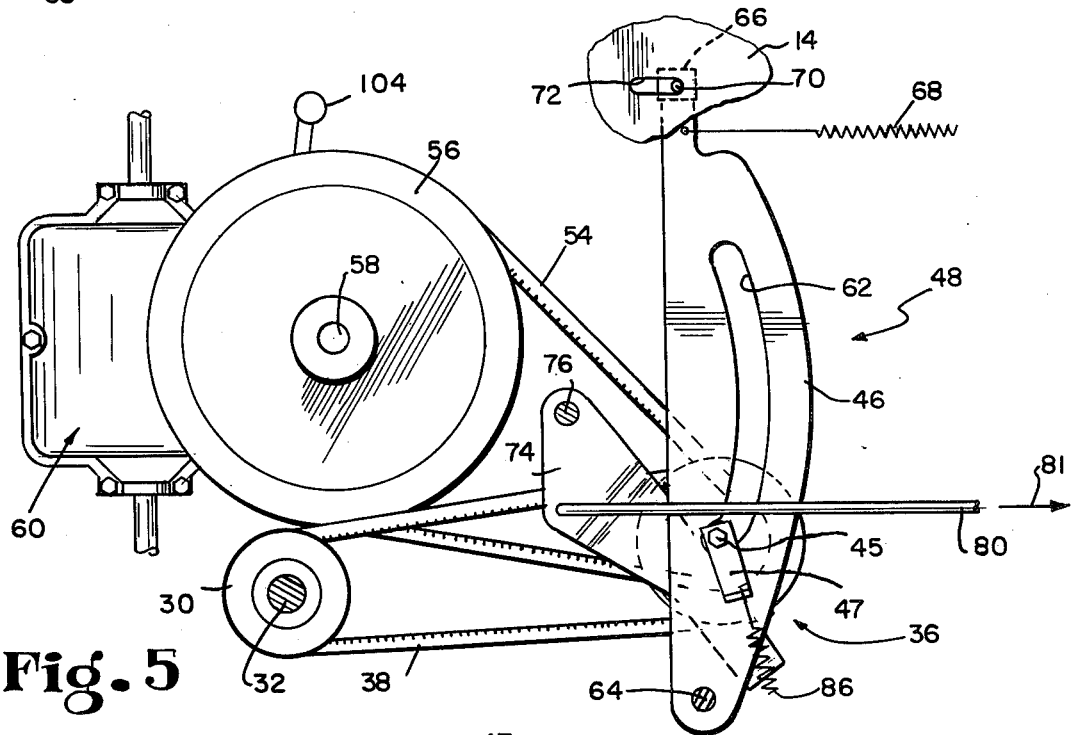
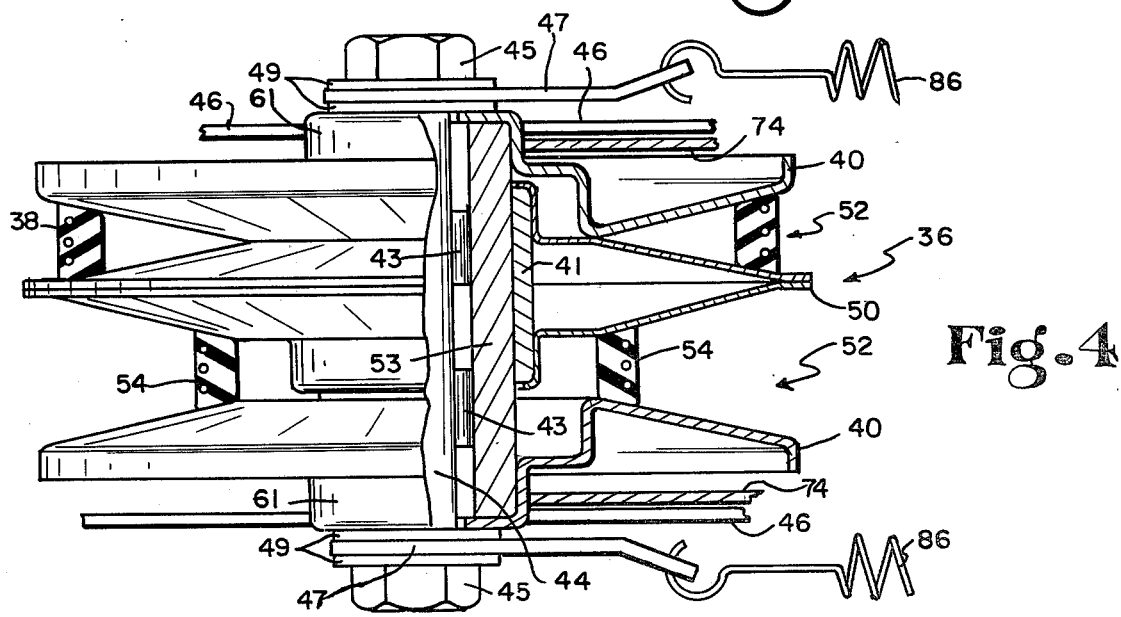

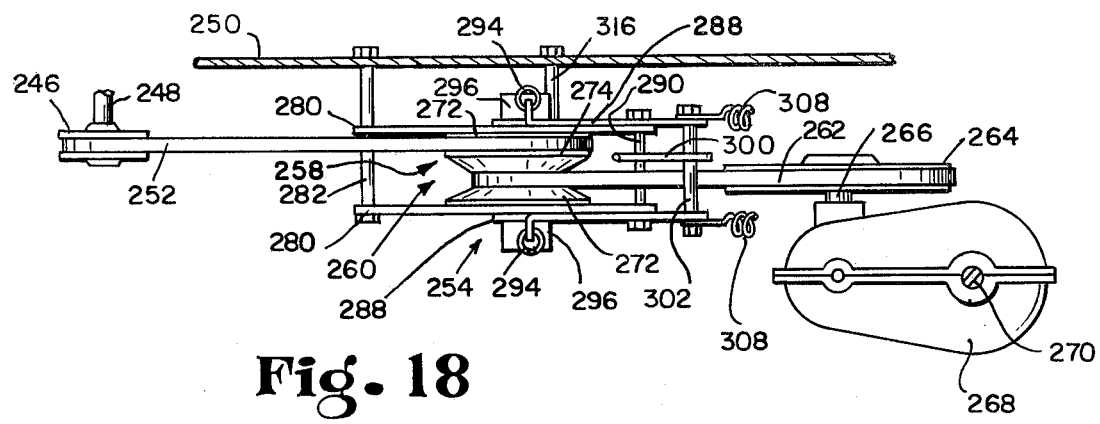
Fig. 18
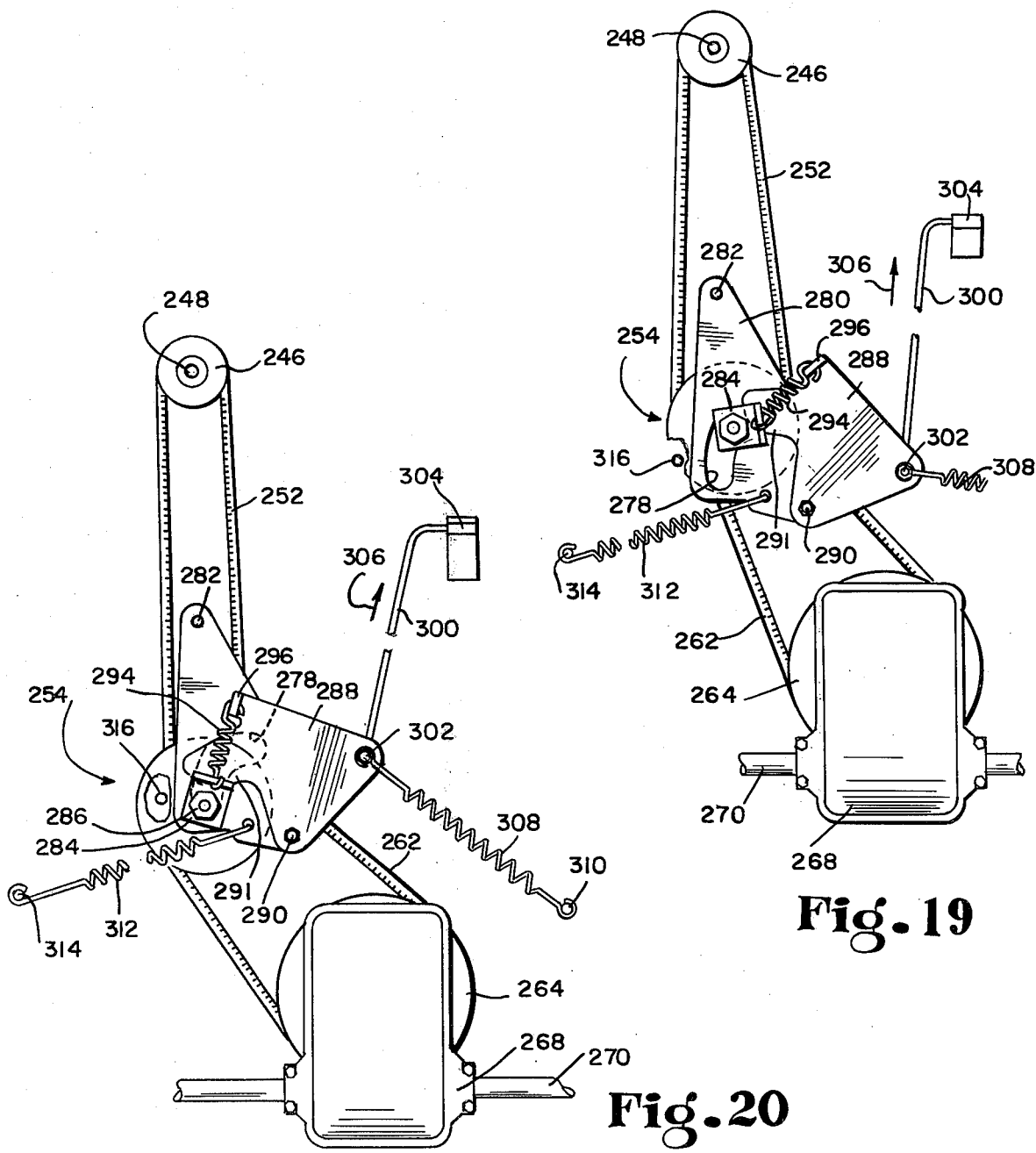
Fig. 19
Fig. 20

VARIABLE SPEED DRIVE

BACKGROUND OF THE INVENTION

This application is related in subject matter to my concurrently filed applications Ser. No. 791,226, filed Apr. 27, 1977 and Ser. No. 791,373, filed Apr. 27, 1977.

This invention relates to variable speed drives. More specifically, the invention relates to a variable speed drive system for use in small riding vehicles such as riding lawn mowers, garden tractors, and the like.

A wide variety of variable speed drives for small self-propelled vehicles are available throughout the prior art. Typically, such systems comprise a small driving motor such as a gasoline engine for rotating a driving pulley. The driving pulley is coupled by a V-belt to a driven pulley which imparts rotational motion to variable speed means such as a set of planetary gears. In operation, the vehicle operator adjusts the gears to select a desired rate and direction of travel, and then drivingly engages the V-belts with the pulleys to drive the vehicle. See, for example, U.S. Pat. Nos. 3,789,684; 3,311,186; and 3,575,252.

Variable speed gear assemblies for use in riding lawn mowers and other small riding vehicles have not been totally satisfactory because of their relatively high cost. Further, conventional gear assemblies do not provide continuous speed variation over a wide range of low to high speeds without shifting gears. Moreover, gear drive systems have typically utilized a single V-belt which is subjected to large starting forces upon initial engagement with the pulleys. These large starting forces often cause the vehicle to dangerously buck and jerk. The existence of large starting forces also significantly shortens the operational life of the V-belt, and thereby requires frequent belt replacement.

Some variable speed drives have been proposed using a double pulley variable speed sheave for obtaining wide range speed variation. See, for example, U.S. Pat. Nos. 3,015,237; 3,457,797; 3,470,757; and 3,583,535. The variable speed sheave is mounted between a driving pulley and a driven pulley, with a second V-belt coupling the sheave with the driven pulley. The driven pulley in turn imparts rotational motion to the vehicle wheels via chains and sprocket wheels or the like. Speed variation is obtained by shifting the variable speed sheave with respect to the other pulleys to alter the sheave drive ratio. However, in such prior art systems, it is common practice to maintain one of the V-belts under driving tension at all times and to selectively engage and disengage the other V-belt for starting and stopping of the system. Thus, upon initial motion of the vehicle, one belt is required to absorb large starting forces. Accordingly, the dangerous bucking and jerking starts inherent with single belt drive systems have not been satisfactorily eliminated.

In recent years, safety has become an increasingly important criteria in the design of riding lawn mowers and the like. Accordingly, it is highly desirable to have drive assemblies such as gears, sprocket wheels, chains, etc. inaccessibly housed for safe vehicle operations. In this regard, prior art variable speed gear assemblies are advantageous in that they are typically enclosed within a gear box. On the other hand, chains and sprocket wheels used with variable speed sheaves are often mounted in an accessible location on the underside of the vehicle. See also U.S. Pat. Nos. 3,777,585 and 3,759,342. These exposed driving elements are inherently dangerous, and are frequently involved in severe consumer accidents.

It has also become desirable for riding lawn mowers and other small riding vehicles to include a so-called dead man control for automatically and immediately disabling the vehicle drive system in the event the operator falls off the vehicle or otherwise becomes unable to properly operate the vehicle. Generally, however, prior art riding vehicles have failed to utilize such dead man controls. Instead, prior art vehicles have used conventional clutch mechanisms which are normally biased for maintaining the drive system in an engaged, operating condition. Such clutch mechanisms require positive operator action to disable the drive system, and thereby cause the vehicle to continue operation in the event the operator falls off the vehicle.

Maintenance has also become an increasingly important aspect in the design of small vehicles such as riding lawn mowers. In particular, it is well known that V-belts used in belt drive systems tend to stretch during use. Eventually, the belts stretch to an extent whereby they no longer drivingly engage their respective pulleys. To this end, it is common practice to utilize springably biased pulley-carrying arms or springably biased idler pulleys for maintaining belts under driving tension. See, for example, U.S. Pat. Nos. 3,583,535; 3,015,237; 3,457,797; and 3,470,757. These mechanisms serve to maintain relatively constant tension on the belts regardless of belt stretching and regardless of belt velocity during operation. However, for maximum belt operating life, it is also desirable to adjust belt tension in accordance with operating speed while simultaneously adjusting for belt stretching. Specifically, some vehicles such as riding mowers require relatively high belt tension at high horsepower, high speed operating conditions, and relatively low belt tension at low horsepower, low speed operating conditions for optimum belt life. Other types of vehicles such as some recreational vehicles require relatively high belt tension at low speeds and relatively low belt tension at high speeds for optimum belt life. Prior art devices which amount for belt stretching have failed to satisfactorily adjust belt tension over a range of operating speeds.

The variable speed drive of this invention provides an integrated drive system for a riding lawn mower or the like which overcomes the many problems and disadvantages of the prior art. Specifically, this invention provides a variable speed sheave assembly and driving belts in a variable speed drive which smoothly starts and drives a vehicle without significant bucking or jerking, and which provides speed variations over a continuous wide range. Moreover, this invention provides a variable speed drive which has substantially enclosed and concealed driving elements, which provides an effective dead man control, and which adjusts belt tension in accordance with operating speed.

SUMMARY OF THE INVENTION

In accordance with a preferred embodiment of the invention, a variable speed drive for a riding lawn mower or the like has a double pulley variable speed sheave assembly. The sheave assembly is coupled by a first V-belt to a motor-operated driving pulley, and by a second V-belt to a driven pulley. The sheave assembly is positioned along the cam profile of a cam arm, and is shifted along the cam profile between a stopped position and a range of low to high speed operating positions by mechanical linkage means controllable by the vehicle operator. The sheave assembly is biased toward a normally stopped position whereby positive action by the vehicle operator is required to place and maintain the sheave assembly in said range of operating positions. The cam arm is also biased generally away from the driving and driven pulleys for maintaining the belts under driving tension throughout the range of operating positions, and in a manner such that belt tension increases with increases in operating speed.

The cam profile is carefully configured with respect to the positions of the driving and driven pulleys so that the sheave assembly is movable by said linkage means from a stopped position with both belts drivingly declutched to a low speed operating position wherein both belts substantially simultaneously drivingly engage their respective pulleys and the sheave assembly. The sheave assembly is further movable along the biased cam arm through the range of speed positions toward a high speed operating position. The configuration of the cam profile with respect to the driving and driven pulley is such that the biasing forces on the cam arm increase as operating speed increases whereby the driving tension on the belts correspondingly increases. Spring means is provided for automatically returning the sheave assembly to the stopped position in the event the linkage means is released by the operator.

The driven pulley of the variable speed drive is coupled to a transaxle assembly carried in a closed housing. The driven pulley drives in opposite directions a pair of bevel gears within the housing. Rotational motion of one of the bevel gears is selectively coupled by the vehicle operator through a differential assembly to the rear wheels of the vehicles for selective operation of the vehicle in either a forward or reverse direction.

BRIEF DESCRIPTION OF THE DRAWINGS

The accompanying drawings illustrate the invention. In such drawings:

FIG. 3 is an enlarged fragmented vertical section taken on line 3—3 of FIG. 2;

FIG. 4 is an enlarged fragmented vertical section taken on the line 4—4 of FIG. 3, with portions broken away;

FIG. 5 is an enlarged fragmented top plan view of the variable speed drive of FIGS. 2 and 3, and showing the drive in a stopped position;

FIG. 18 is a vertical section taken on the line 18—18 of FIG. 17;

FIG. 19 is an enlarged fragmented horizontal section similar to FIG. 17, and showing the drive in a low speed position; and FIG. 20 is an enlarged fragmented horizontal section similar to FIG. 17, and showing the drive in a high speed position.

DETAILED DESCRIPTION OF THE PREFERRED EMBODIMENT

Figure 1:
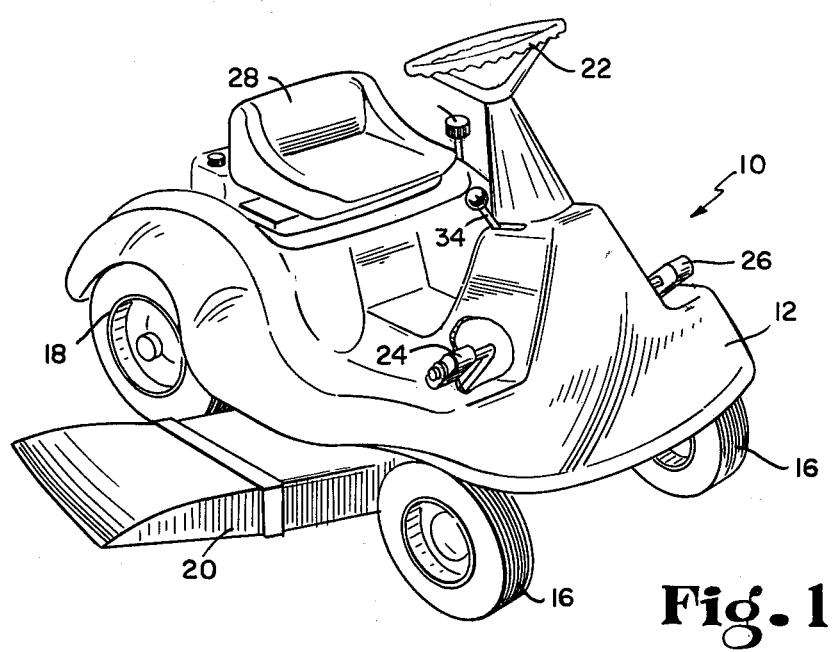
FIG. 1 is a perspective view of a riding lawn mower having a variable speed drive of this invention.

A riding lawn mower 10 is shown in FIG. 1, and generally comprises a molded shell body 12 carried over a vehicle frame (not shown in FIG. 1). The frame supports a pair of front wheels 16 and a pair of rear wheels 18, and a lawn mowing assembly 20 is carried on the frame near the ground generally between the front and rear wheels. Directional control for the vehicle is provided by a steering wheel 22 coupled to the front wheels 16 by means of any suitable steering linkage. An accelerator pedal 24 for controlling vehicle speed is provided on one side of the steering wheel 22, and a brake pedal 26 is provided on the other side. Both pedals 24 and 26 are controllable by an operator for whom a seat 28 is provided generally over the rear wheels 18. The variable speed drive of this invention together with a driving motor (not shown), such as a small gasoline engine, are enclosed within the shell body 12 generally under the seat 28. Importantly, while a riding mower is shown in FIG. 1, it should be understood that the variable speed drive of this invention is equally applicable with garden tractors and other self-propelled vehicles.

Figure 2:
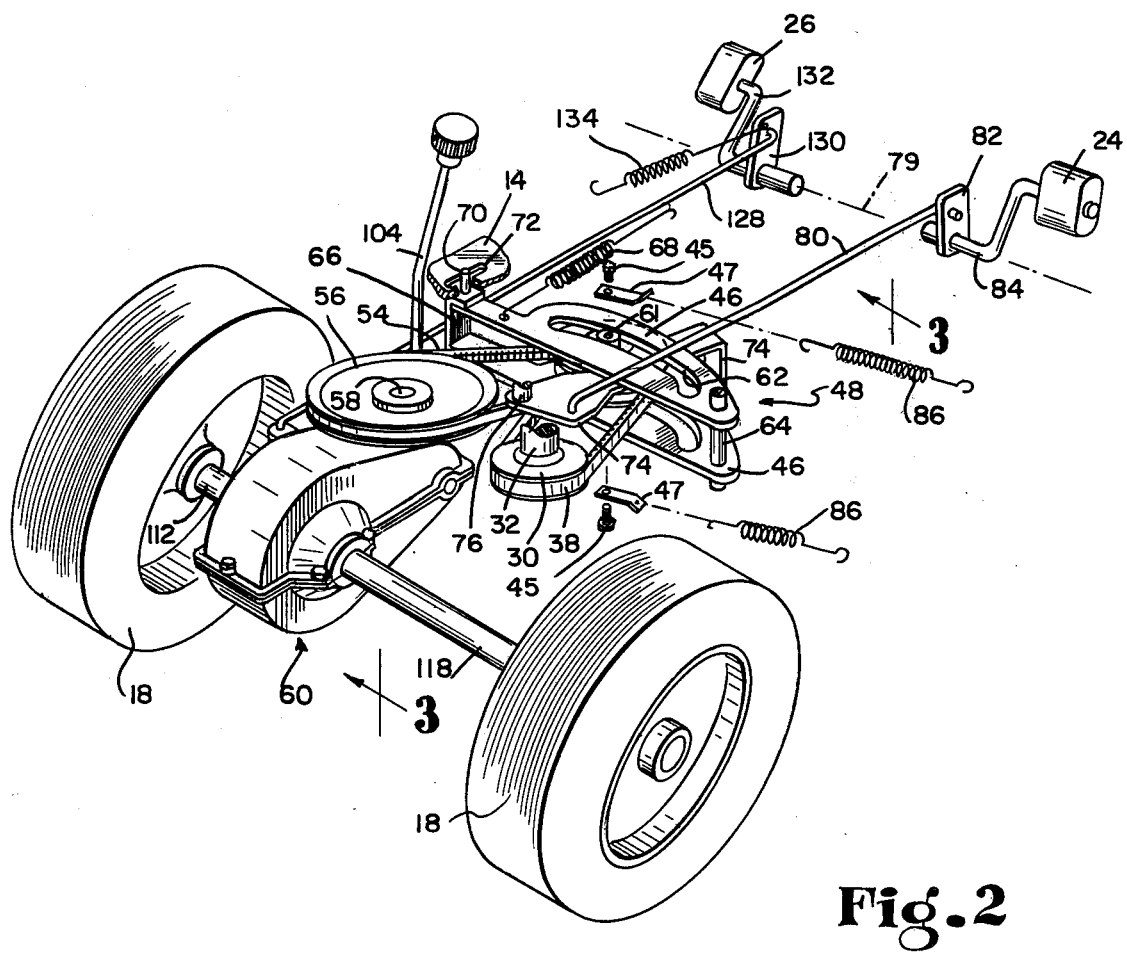
FIG. 2 is a perspective view of the variable speed drive of this invention, with portions broken away and portions shown in exploded form.

The variable speed drive of this invention is shown in detail in FIGS. 2 and 3. As shown, a horizontally rotatable driving pulley 30 is fixed to the lower end of a vertically extending shaft 32. The shaft 32 is rotatably driven by the driving motor (not shown) which is fixed to the upper end of the shaft and is mounted on the vehicle frame (also not shown). The shaft 32 and the driving pulley 30 are thus rotatable by the motor at a rate of speed in accordance with motor speed. Conveniently, motor speed is variable by means of a hand-operated throttle 34 shown adjacent the steering wheel in FIG. 1.

The driving pulley 30 is coupled to a double pulley, variable speed sheave assembly 36 by a driving belt 38. The driving belt 38 comprises a rubberized continuous V-belt of generally conventional construction, and is reeved about the driving pulley 30 and the sheave assembly. Accordingly, rotational motion of the driving pulley 30 is imparted through the V-belt 38 to the sheave assembly 36.

As shown in detail in FIG. 4, the sheave assembly 36 comprises a pair of outer pulley halves 40 fixed in opposed relation on a vertical sleeve 53. The sleeve 53 is rotatably carried by bearings 43 near opposite ends of a vertical shaft 44. The sleeve 53 and the pulley halves 40 are in turn retained on the shaft 44 by washers 49 and bolts 45. An inner pulley section 50 is positioned between the two outer pulley halves 40, and is carried on a hub 41 which is slidably received over the sleeve 53. The inner pulley section 50 combines with the two outer halves 40 to form a pair of vertically spaced pulley grooves 52 with generally V-shaped cross sections. As shown, the driving belt 38 is reeved about the upper one of said pair of pulley grooves 52. Importantly, because the inner pulley section 50 slides axially between the outer halves 40, the two pulley grooves 52 of the sheave assembly 36 have inversely proportional effective diameters. That is, as the inner section 50 moves away from the uppermost pulley half 40, the effective diameter of the belt-receiving upper groove 52 decreases to thereby increase the effective diameter of the lower groove 52.

The lowermost pulley groove 52 of the variable speed sheave assembly 36 has a driven V-belt 54 reeved therebout. This driven belt 54 also comprises a conventional-type continuous belt of rubberized construction, and is reeved about a relatively large driven pulley 56 to couple said pulley 56 to the sheave assembly 36. The driven pulley 56 is horizontally retained on a vertical shaft 58 which imparts rotation of the driven pulley 56 through a transaxle assembly 60 and further to the rear wheels 18 of the vehicle. Thus, rotation of the driving pulley 30 is transmitted through the variable speed sheave assembly 36, the driven pulley 56, and the transaxle assembly 60 to drive the rear wheels 18, with the drive speed being controlled in accordance with the drive ratio of the sheave assembly 36.

The outer pulley halves 40 of the sheave assembly 36 have axially outwardly extending shoulders 61 received in slots 62 formed in parallel horizontally extending cam arms 46. More specifically, a cam assembly 48 is provided comprising a pair of cam arms 46 formed from metal or the like. The two cam arms 46 are vertically spaced, and are connected together at one end by a vertically extending pivot pin 64. The pin 64 extends upwardly from the arms 46 for pivotal connection to the vehicle frame (not shown). The two cam arms 46 extend in parallel from the pin 64 generally transversely across the vehicle in front of the driving and driven pulleys 30 and 56, as shown in FIGS. 2 and 3. The cam arms 46 each have an identical slot 62 extending along its length, with said slot being generally arcuately curved with respect to the axial centers of the driving and driven pulleys to form a cam profile. One of the cam arms 46 extends over the top of the sheave assembly 36 and has the shoulder 61 of the upper pulley half 40 slidably received in its cam slot 62. Similarly, the other cam arm 46 extends below the sheave assembly 36 and has the shoulder 61 of the lower pulley half 40 slidably received in its cam slot 62.

A cam arm bracket 66 fixedly interconnects the ends of the cam arms 46 opposite the pivot pin 64 to provide a rigid cam arm structure. Helical springs 68 are respectively connected to the two cam arms 46 and extend generally forwardly from the cam arms 46 for connection at a suitable location to the vehicle frame (not shown). The two springs 68 are loaded under tension so that the two cam arms 46 are together urged forwardly to rotate in a clockwise direction about the vertical axis of the pivot pin 64, as viewed in FIG. 2. Thus, the cam arms 46 are urged by the springs 68 to urge the sheave assembly away from the driving and driven pulleys 30 and 56 to maintain the two V-belts 38 and 54 under driving tension. Conveniently, the magnitude of cam arm pivoting movement is limited by a pin 70 extending upwardly from the cam arm bracket 66 and received in a longitudinally elongated slot 72 formed in the vehicle frame 14, as shown in FIGS. 2 and 3.

A mechanical control linkage is provided for enabling the operator of the vehicle to selectively control the position of the sheave assembly 36 along the cam slots 62, and thereby control the drive ratio of the sheave assembly. The control linkage comprises a bell crank 74 which is centrally pivotally connected to the vehicle frame by a vertically extending pin 76. From the pin 76, as shown in FIGS. 2-4, the bell crank 74 extends forwardly under the adjacent upper cam arm 46 and above the sheave assembly 36 in abutting engagement with the shoulder 61 of the upper pulley half 40. Importantly, the bell crank 74 abuts said shoulder on its side adjacent the cam arm pivot pin 64. The bell crank 74 extends forwardly beyond the cam arms 46, and then turns downwardly and then rearwardly to form a stabilizer arm 78 for similarly abutting the shoulder 61 of the lower pulley half 40. Again, the stabilizer arm 78 abuts said lower pulley half 40 on its side adjacent the cam arm pivot pin 64.

The bell crank 74 also extends laterally outwardly from its connecting pin 76 toward the right side of the vehicle as viewed in FIGS. 2 and 4, and is there connected to a forwardly extending control arm 80. More specifically, the control arm 80 is pivotally connected to the bell crank 74, and extends forwardly for pivotal connection to the upper end of a crank arm 82. The lower end of the crank arm 82 is fixed to one end of a horizontally extending rockshaft 84 which is mounted on the frame in any suitable manner (not shown) for rotation about the axis shown by the dotted line 79 in FIG. 2. The opposite end of the rockshaft is turned laterally outwardly for mounting thereon of the accelerator pedal 24. Accordingly, pushing downwardly and forwardly on the accelerator pedal 24 by the vehicle operator throws the control arm 80 forwardly. This, in turn, pivots the bell crank 74 counterclockwise about the axis of the connecting pin 76 as viewed in FIG. 2, and against the shoulders 61 of the sheave assembly 36. This urges the sheave assembly toward the left hand end of the cam slots 62 of the cam arms 46 to vary the sheave assembly drive ratio, as will be described hereafter in more detail. Importantly, connecting links 47 are interposed between washers 49 at opposite ends of the sheave shaft 44. The connecting links extend outwardly from the sheave assembly above and below the cam arms 46 for connection to springs 86. The springs 86 are in turn connected to suitable locations on the vehicle frame such that the springs 86 are tension loaded to urge the sheave against the bell crank 74. In this manner, the sheave assembly 36 and the mechanical control linkage are returned to the same positions whenever operator pressure on the accelerator pedal 24 is released.

Figure 6:
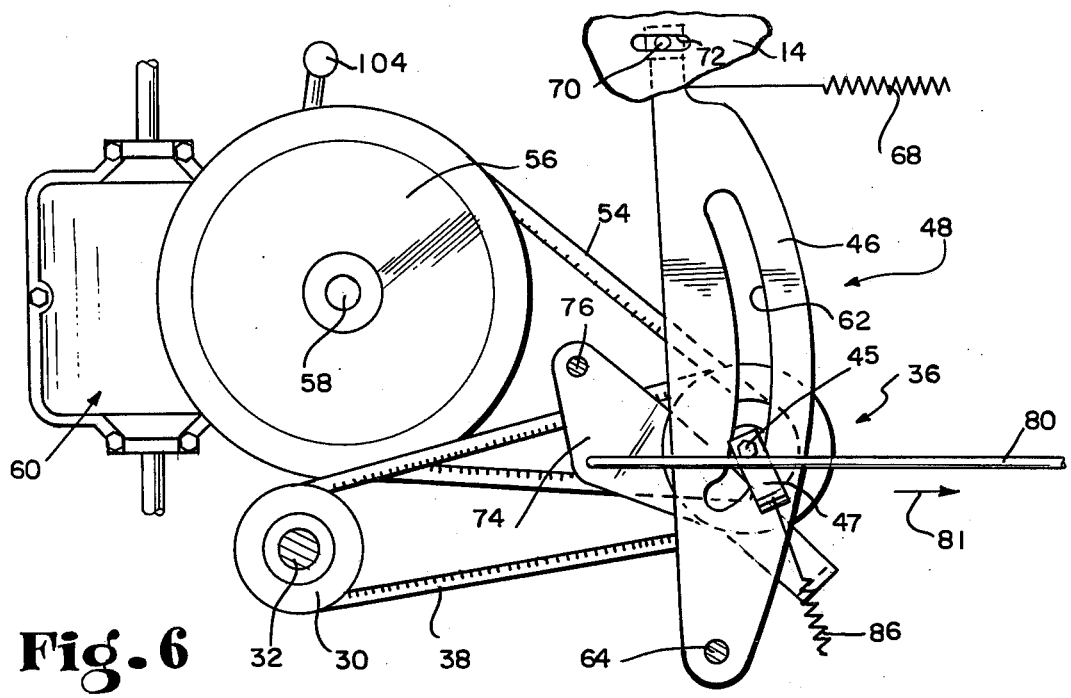
FIG. 6 is an enlarged fragmented top plan view similar to FIG. 5, and showing the drive in a low speed position.
Figure 7:
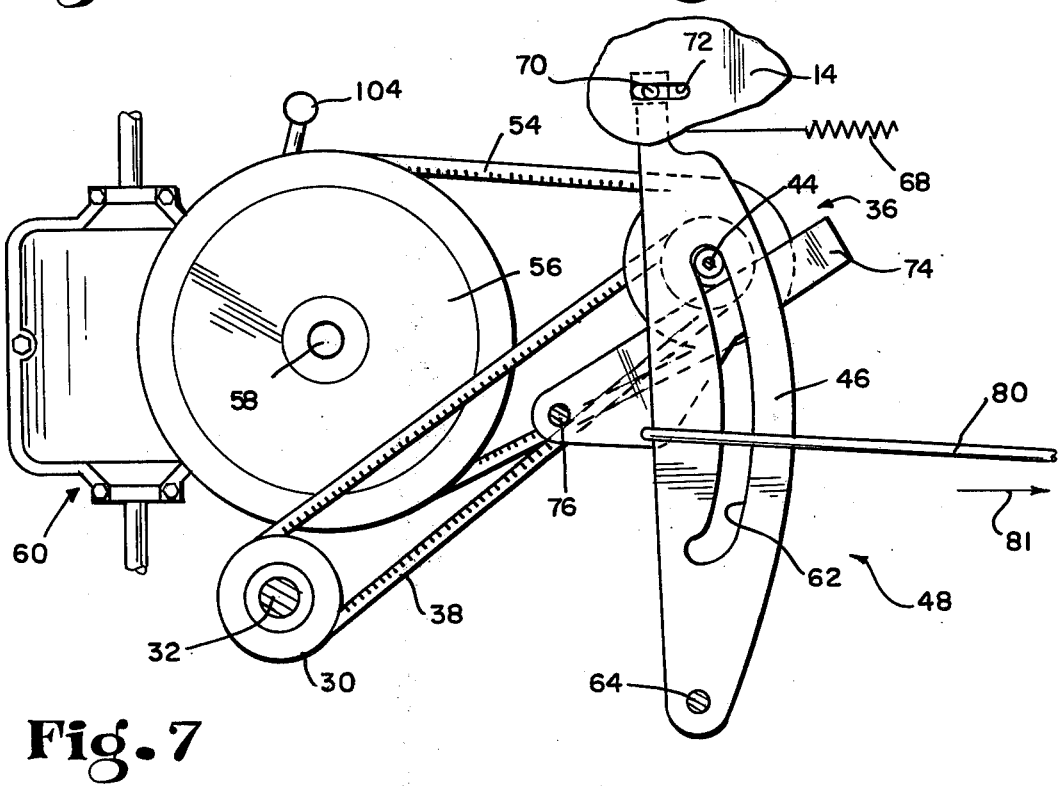
FIG. 7 is an enlarged fragmented top plan view similar to FIG. 5 and showing the drive in a high speed position.

Operation of the variable speed sheave assembly 36 is shown in FIGS. 5-7. As shown in FIG. 5, the sheave assembly is urged by the springs 86 to the end of the cam slots 62 adjacent the cam arm pivot pin 64. This end of the cam slots 62 is curved toward the axial centers of the driving and driven pulleys 30 and 56 so that both of the V-belts 38 and 54 are drivingly disengaged from their respective sheave pulley grooves 52. Thus, whenever the accelerator pedal is not depressed, the drive assembly is in a double declutched stopped configuration even though the driving pulley 30 may be rotated by the vehicle motor. In this position, the cam arm springs 68 urge the cam arms 46 forwardly until the stop pin 70 engages the forwardmost end of its slot 72.

The variable speed sheave assembly 36 is moved from the stopped position of FIG. 5 to a low speed operating position as shown in FIG. 6 whenever the vehicle operator pushes downwardly and forwardly on the accelerator pedal 24. This pulls forwardly on the control arm 80 as indicated by arrow 81 to pivot the bell crank 74 counterclockwise into abutting engagement with the sheave assembly 36. Sufficient force on the pedal 24 overcomes the effects of the springs 86 and causes the sheave assembly to move along the cam slots 62 in a direction away from the cam arm pivot pin 64. The slots 62 are carefully configured so that the sheave assembly 36 is moved away from the axial centers of the driving and driven pulleys 30 and 56 to cause both of the V-belts 38 and 54 to smoothly and gradually engage their respective pulleys substantially simultaneously. Importantly, in the position shown in FIG. 6, the axial center of the sheave assembly 36 is relatively near the driving pulley 30 and relatively far from the driven pulley 56 so that the sheave assembly is in a relatively low speed drive ratio. In the event operator pressure on the accelerator pedal 24 is released, the sheave springs 86 provide dead man control to automatically move the sheave assembly 36 back to the stopped position of FIG. 5.

Additional pressure on the accelerator pedal 24 moves the sheave assembly 36 from the low speed operating position of FIG. 6 toward a relatively high speed drive ratio as shown in FIG. 7. That is, further downward movement of the pedal 24 moves the sheave assembly further along the cam slots 62. The cam slots 62 are shaped such that this movement carries the sheave assembly 36 away from the axial center of the driving pulley 30 and toward the axial center of the driven pulley 56. In this manner, the driving belt 38 is forced to ride deeper in its pulley groove 52, and thereby force the driven belt 54 to ride higher in its pulley groove 52 as the inner pulley section 50 shifts position. Accordingly, the rotational speed of the sheave assembly 36 increases as it is moved from the low speed operating position toward the high speed operating position. Again, the springs 86 provide dead man control to move the sheave assembly 36 toward the low speed position and then to the double declutched stopped position of FIG. 5 whenever operator pressure on the accelerator pedal 24 is released.

When the sheave assembly 36 is positioned along the cam slots 62 within the range of low to high speed operating positions, the two V-belts 38 and 54 are under driving tension. The belt tension forces act upon the two cam arms 46 to urge the cams to rotate about their pivot pin 64 toward the driving and driven pulleys 30 and 56. This causes the cam springs 68 to stretch a short distance so that the stop pin 70 is carried a short distance away from the forwardmost end of its frame slot 72. Thus, belt tension forces are offset by forces applied to the cam arms 46 by the cam springs 68. Those spring forces equal the multiple of the distance the springs 68 stretch and the spring constant of said springs 68. Accordingly, belt tension is related to the magnitude of the forces applied by the cam springs 68, and the pin 70 is allowed to float within its slot 72 to a position governed by the degree of belt stretching during operation. Importantly, the configuration of the cam slots 62 is such that the degree of stretching of the cam springs 68 increases steadily as the sheave assembly is moved from the low speed toward the high speed operating positions. In this manner, the spring forces acting upon the cam arms increase with increases in operating speed to meet optimum belt operating parameters. That is, a relative minimum belt tension is required at low horsepower, low speed operating conditions. As operating speed is increased, a relatively high belt tension is required for the relatively high horsepower, high speed operating conditions.

Figure 8:
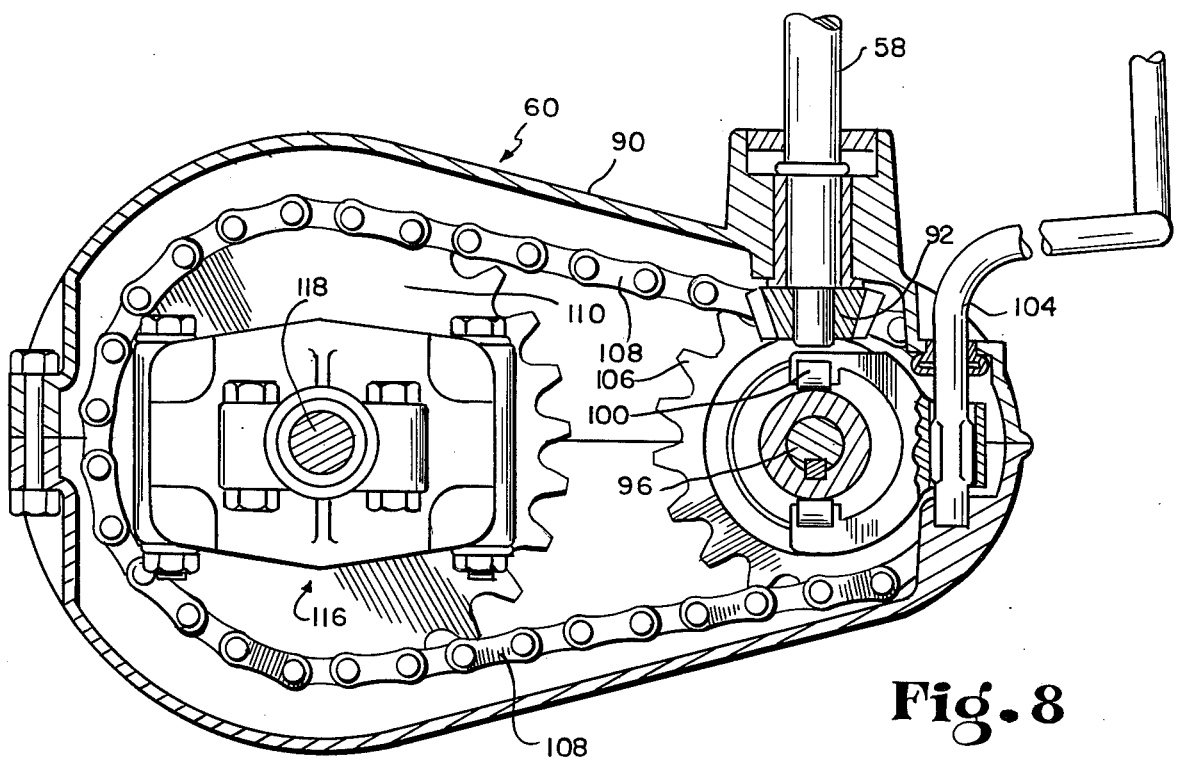
FIG. 8 is an enlarged vertical section of a transaxle assembly for use in the variable speed drive of this invention.
Figure 9:
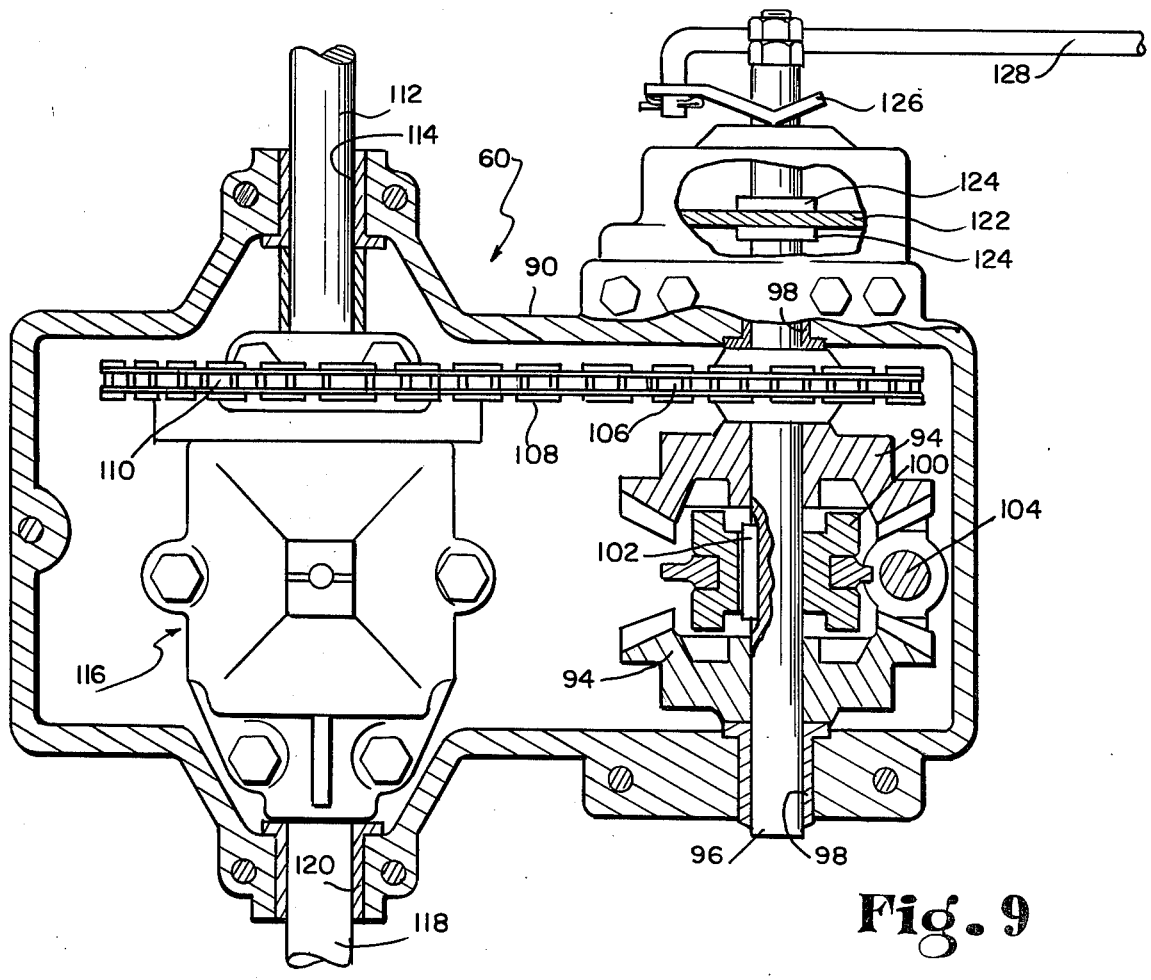
FIG. 9 is a horizontal section of the transaxle assembly of FIG. 7.

The transaxle assembly 60 is shown in detail in FIGS. 8 and 9. As shown, the shaft 58 carrying the driven pulley 56 comprises an input shaft for the transaxle assembly, and has its lower end coupled within an enclosed transaxle housing 90 to a horizontally disposed input bevel gear 92. This input bevel gear 92 is in constant mesh with a pair of facing side bevel gears 94 carried on a horizontal shaft 96, and thus drives the gears 94 in opposite rotational directions. The two side bevel gears 94 are freely rotatable on the shaft 96 which in turn rotates within bearings 98 mounted on the transaxle housing 90. A driving dog 100 is carried on the transaxle shaft 96 between the side bevel gears 94. The driving dog 100 is positioned on the shaft 96 by a key 102 for axial sliding movement along the shaft and for rotation with the shaft. The driving dog is moved along the shaft 96 by a shift lever 104 extending upwardly from the transaxle assembly 60 to engage the dog with one of the two side bevel gears 94. In this manner, the transaxle shaft 96 is caused to rotate within its bearings 98 in a selected one of two rotational directions for either forward or reverse transmission of power.

A sprocket wheel 106 is also keyed on the transaxle shaft 96 for rotation therewith. The sprocket wheel 106 is connected by a driving chain 108 carried within the transaxle housing 90 to a rear sprocket wheel 110 coupled to a differential assembly 116 which is also mounted within the transaxle housing 90. The rear sprocket wheel 110 is coupled through the differential assembly 116 by conventional gearing (not shown) to a pair of rear axles 112 and 118 for the vehicle which are respectively carried in bearings 114 and 120. Each of the rear axles 112 and 118 is connected to one of the rear wheels 18 such that rotational motion is coupled through the sprocket wheel 110 and differential assembly 116 to the rear wheels 18. In this manner, when the driving dog 100 is situated for engagement with one of the side bevel gears 94 for driving of the transaxle shaft 96, the rear axles 112 and 118 are driven in the same rotational directions to drive the rear wheels 18 of the vehicle. Accordingly, forward or reverse driving speeds are available throughout the range of drive ratios of the variable speed sheave assembly 36.

Brake apparatus is also provided for the vehicle, and is shown in FIGS. 2 and 9. As shown, a braking disk 122 is fixed on the transaxle shaft 96 for rotation therewith. The brake disk 122 is disposed between a pair of self-releasing brake pads 124 which are operated by a brake arm 126, all in a well-known manner. The brake arm 126 is connected to one end of a forwardly extending brake link 128, which has its other end connected to a crank arm 130 at the front of the vehicle. The crank arm 130 is coupled to a brake rockshaft 132 which is connected to the vehicle frame in any suitable manner (not shown) for rotation about the axis shown by the dotted line 79 in FIG. 2. The laterally outer end of the rockshaft 132 has the brake pedal 26 mounted thereon.

The braking apparatus is controlled by the vehicle operator. When the brake pedal 26 is pushed forwardly and downwardly, the brake link 128 is pulled forwardly to turn the brake arm 126. This causes the brake pads 124 to engage the brake disk 122 and thereby stop the vehicle. Importantly, a tension loaded spring 134 interconnects the brake crank arm 130 with the vehicle frame to urge the brake pedal 26 rearwardly as shown in FIG. 2 to a non-operative position.

Figure 10:
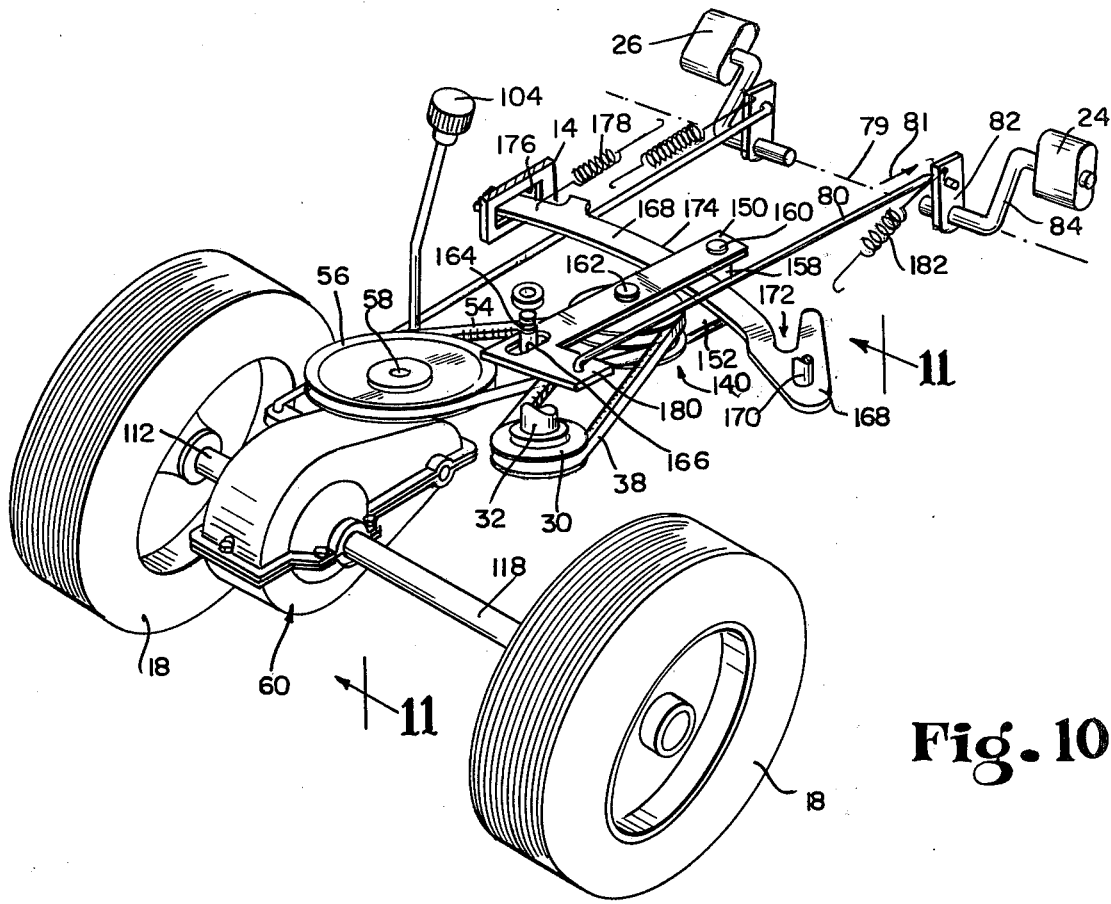
FIG. 10 is a perspective view of an alternate embodiment of the invention.
Figure 11:
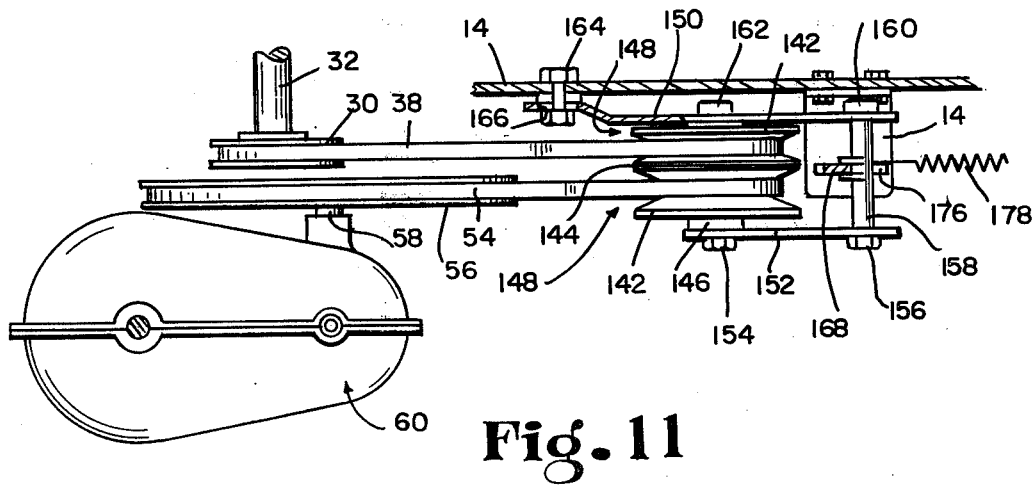
FIG. 11 is an enlarged fragmented vertical section taken on the line 11—11 of FIG. 10.
Figure 12:
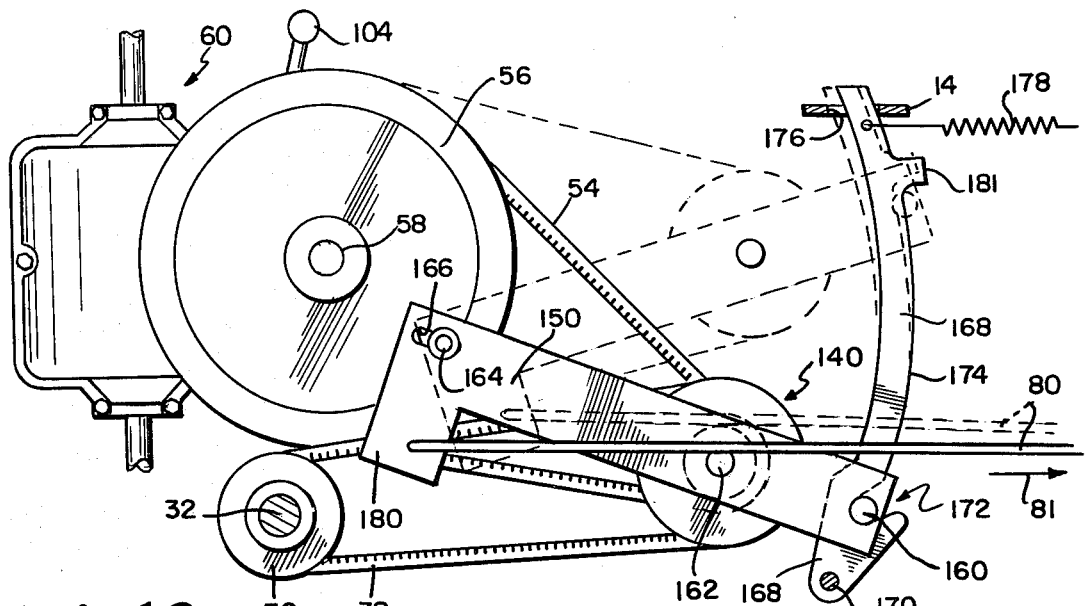
FIG. 12 is an enlarged fragmented top plan view of the embodiment of FIG. 10, and illustrating the operation thereof.

An alternate embodiment of the variable speed drive system of this invention is shown in FIGS. 10–12 wherein components identical with those of the embodiment of FIGS. 1–9 are indicated with like reference numerals. As shown, a driving pulley 30 is carried on a vertical motor shaft 32, and is coupled to a double pulley, variable speed sheave assembly 140 by a driving belt 38. The variable speed sheave assembly 140 has a pair of outer pulley halves 142 and a centrally disposed, slidable inner pulley section 144, all rotatably carried on a sheave shaft 146. The outer pulley halves 142 and the inner pulley section 144 together form a pair of belt-receiving pulley grooves 148, with the inner pulley section 144 being vertically slidable to vary the sheave drive ratio. The driving belt 38 is reeved about the upper pulley groove 148, and a driven belt 54 is reeved about the lower groove 148 and a driven pulley 56. As in the previous embodiment, the driven pulley is carried on a shaft 58 coupled to a transaxle assembly 60 which in turn imparts rotational motion in either a forward or reverse direction to the rear wheels 18 of the vehicle.

The opposite ends of the shaft 146 of the variable speed sheave assembly 140 are fixed respectively to upper and lower parallel plates 150 and 152. More specifically, the lower end of the sheave shaft 146 is secured to the lower plate 152 by a bolt 154. The lower plate 152 extends forwardly from the sheave assembly 140 and is coupled by a bolt 156 to the lower end of a cam follower 158. The cam follower 158 has its upper end connected to the upper plate 150 by a bolt 160, and said upper plate is connected to the upper end of the sheave shaft 146 by a bolt 162. The upper plate 150 extends rearwardly from the sheave assembly and is coupled to the vehicle frame by a vertically extending connecting pin 164 received through a longitudinally extending slot 166 in the upper plate 150. In this manner, the sheave assembly 140 is carried by the plates 150 and 152 with its axis maintained parallel with the axes of the driving and driven pulleys 30 and 56.

A cam arm 168 extends generally transversely across the vehicle as viewed in FIG. 10, and has one end pivotally mounted on the vehicle frame by a vertically extending pin 170. The cam arm 168 has a forwardly presented cam surface 174 which is generally arcuately shaped with respect to the axial centers of the driving and driven pulleys 30 and 56. The opposite end of the cam arm 168 is received in a longitudinal slot 176 in the vehicle frame 14. The cam arm 168 is urged to pivot forwardly about the axis of the pivot pin 170 and away from the pulleys 30 and 56 by a tension loaded spring 178 connected between the frame and said cam arm. Importantly, the cam surface 174 of the cam arm 168 rides against the cam follower 158 to urge the entire sheave assembly 140 forwardly within the limits of the frame slot 176 and within the limits of the longitudinal slot 166 formed in the uppe plate 150. In this manner, the sheave assembly 140 is urged away from the driving and driven pulleys 30 and 56 to maintain driving tension on both of the V-belts 38 and 54.

A mechanical control linkage is provided for controllably shifting the sheave assembly 140 with respect to the cam surface 174 of the cam arm 168 to vary the drive ratio of said sheave assembly. For this, the upper plate 150 has a laterally outwardly extending leg 180 and a control arm 80 is pivotally connected to said leg. The control arm 80 extends forwardly, and is coupled as in the previous embodiment to a crank arm 82, a rockshaft 84, and further to the accelerator pedal 24 for the vehicle. Thus, as the accelerator pedal is pushed downwardly and forwardly by the vehicle operator, the control arm 80 pivots the upper plate 150 counterclockwise about the connecting bolt 164 as viewed in FIG. 10. This throws the sheave assembly 140 to the left along a path defined by the cam surface 174 to increase the distance between the sheave assembly 140 and the driving pulley 30, while at the same time decreasing the distance between the driven pulley 56 and the sheave assembly to increase the sheave assembly drive ratio.

The shape of the cam surface 174 of the cam arm 168 is carefully configured to provide close control of the sheave assembly drive ratio. As shown best in FIG. 12, the end of the cam surface 174 adjacent the pivot pin 170 is hooked rearwardly as at 172 toward the driving and driven pulleys 30 and 56. When the cam follower 158 is received in said hooked portion 172, the sheave assembly 140 is allowed to move toward the driving and driven pulleys 30 and 56 sufficiently to relieve driving tension on both of the V-belts 38 and 54. In this double declutched stopped position, the cam spring 178 urges the cam arm against the forwardmost end of the frame slot 176. As the accelerator pedal 24 is depressed to pull the control arm 80 forwardly in the direction of arrow 81, the upper plate 150 pivots about its connecting bolt 164 to move the cam follower 158 out of the hooked portion 172 of the cam surface 174. This simultaneously and smoothly causes both belts 38 and 54 to drivingly engage their respective pulleys and the sheave assembly to place the sheave assembly in a low speed operating position. As the pedal 24 is further depressed by the vehicle operator, the sheave assembly 140 is moved along the cam surface 174 toward the dotted line position with the cam follower 158 abutting a stop 181 on the cam arm 168. This moves the sheave assembly generally away from the driving pulley 30 and toward the driven pulley 56 to move the sheave assembly toward a high speed operating position. Importantly, dead man control is provided by a tension loaded spring 182 connected between the pedal crank arm 82 and the vehicle frame to bias the pedal 24, the control arm 80, and the sheave assembly 140 to the double declutched stopped position shown in the full lines of FIG. 12 whenever pressure on the accelerator pedal 24 is released.

As in the previous embodiment, the cam arm 168 and the cam spring 178 serve to control driving tension on the belts 38 and 54 for optimum belt operating life. More specifically, the cam spring 178 applies a force on the cam arm 168 equalling the multiple of the distance the spring stretches and the spring constant to assure that the belts are under driving tension whenever the sheave assembly 140 is not in the double declutched stopped position. In a low speed operating position, the spring 178 is minimally stretched so that belt tension is at a minimum for optimum low horsepower, low speed operation. As operating speed increases, the degree of stretching of the spring 178 increases so that belt tension forces are correspondingly increased. This results in relatively higher belt tensions for higher speed operating conditions to match horsepower requirements for riding mowers and thereby optimize belt life.

Figure 13:
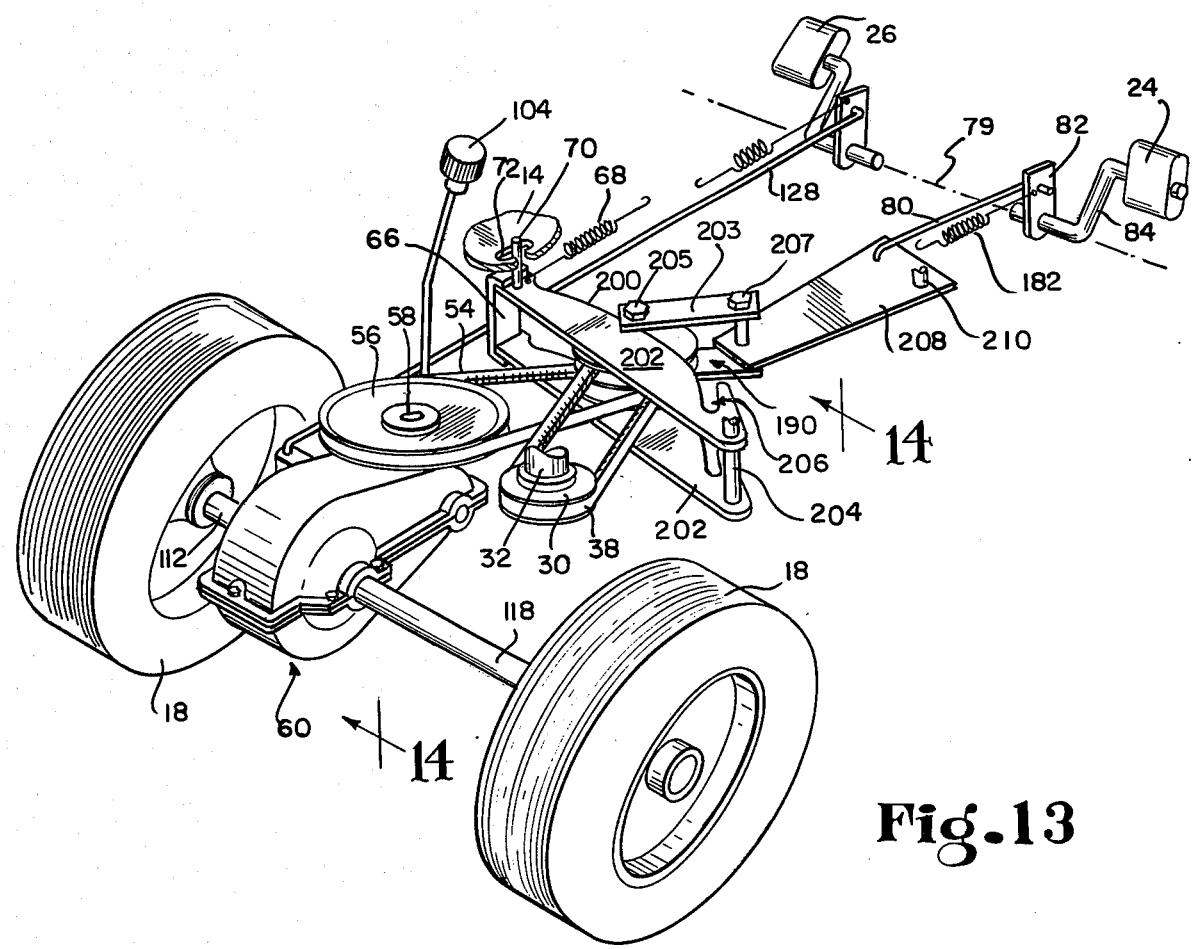
FIG. 13 is a perspective view of another alternate embodiment of the invention.
Figure 14:
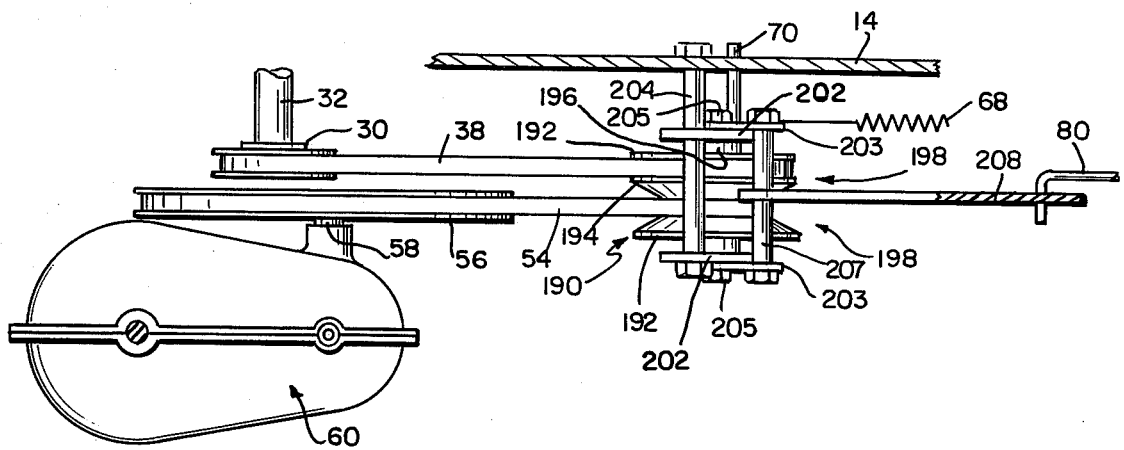
FIG. 14 is an enlarged fragmented vertical section taken on the line 14—14 of FIG. 13.
Figure 15:
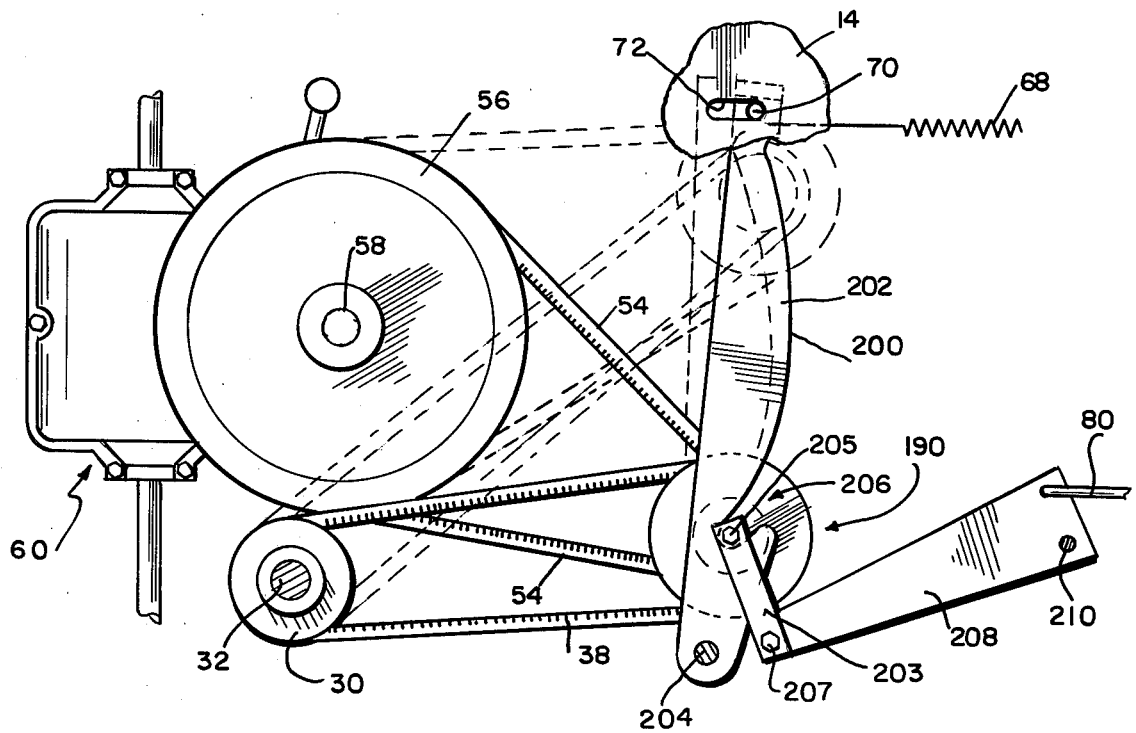
FIG. 15 is an enlarged fragmented top plan view of the embodiment of FIG. 13, and illustrating the operation thereof.
Figure 16:
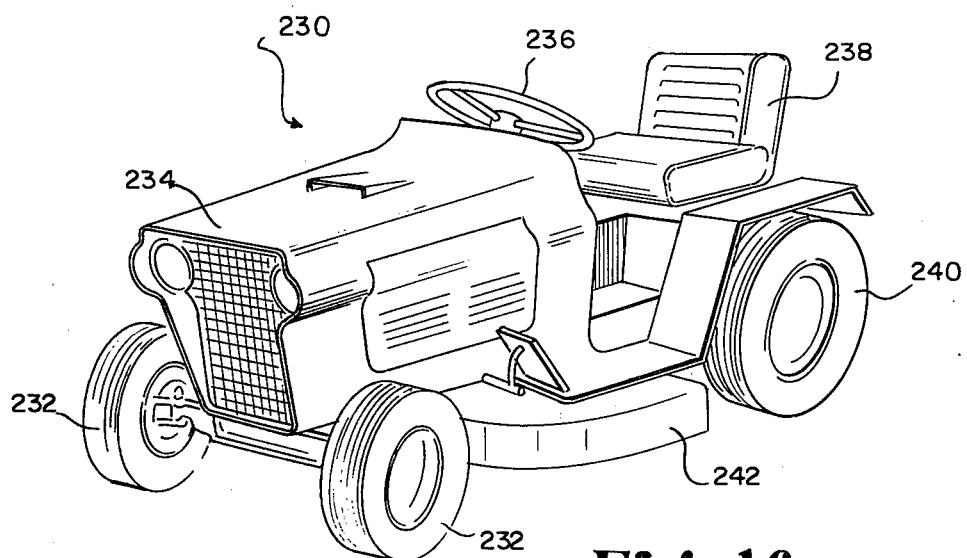
FIG. 16 is a perspective view of an alternate riding lawn mower having still another alternate embodiment of the variable speed drive of this invention.
Figure 17:
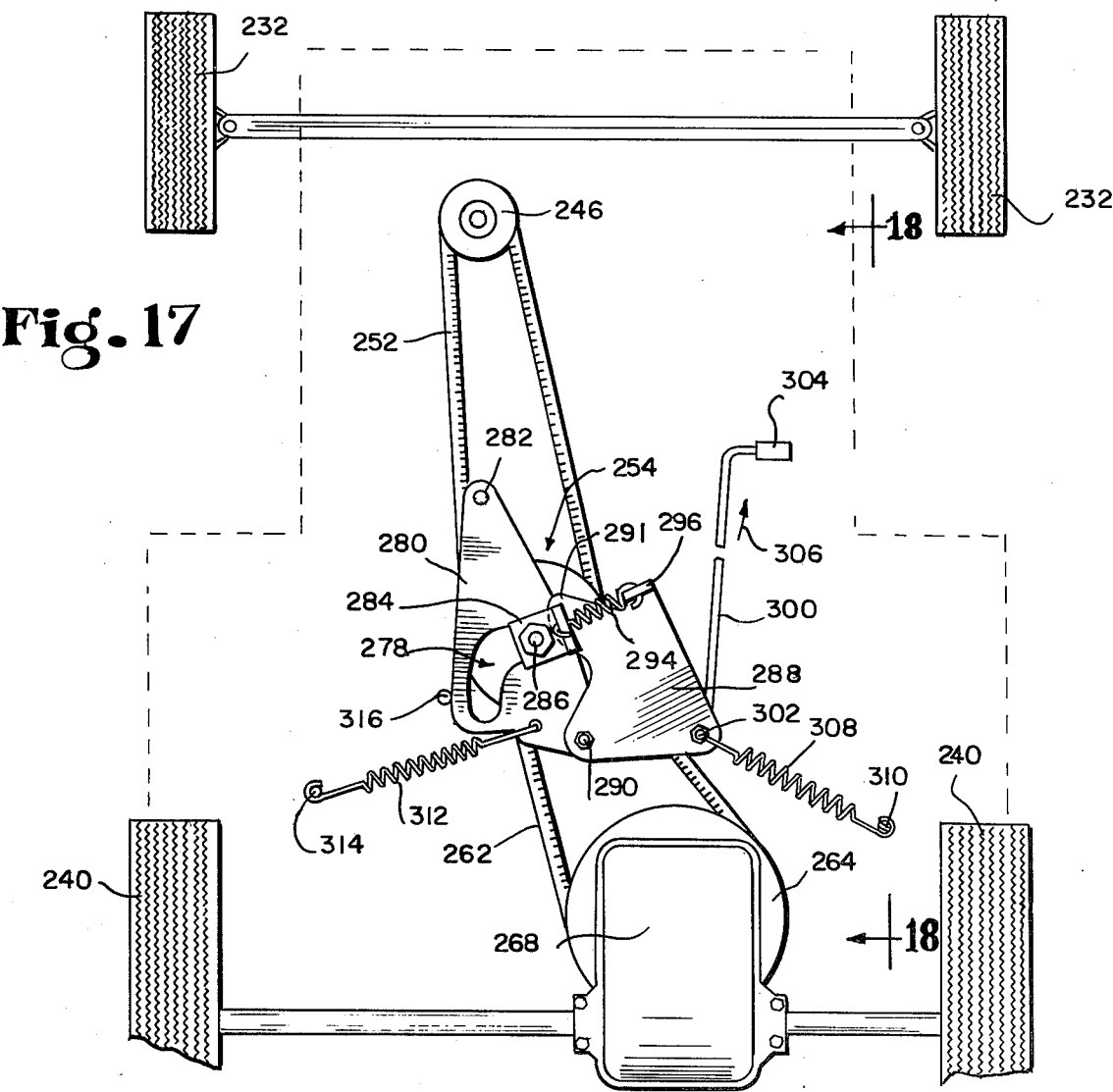
FIG. 17 is an enlarged fragmented bottom plan view of the mower of FIG. 16 showing the alternate variable speed drive, with portions broken away and with the lawn mowing assembly removed.

Another embodiment of the variable speed drive system of this invention is shown in FIGS. 13-15. Again, where components are identical with those of previous embodiments, like reference numerals are used. As shown, a driving pulley 30 is carried on a vertical motor shaft 32, and is coupled to a variable speed sheave assembly 190 by a driving belt 38. The variable speed sheave assembly 190 has a pair of outer pulley halves 192 and an inner pulley section 194 all rotatably carried on a vertically extending sheave shaft 196. The outer pulley halves 192 and the inner pulley section 194 together form a pair of belt-receiving, horizontal pulley grooves 198 with the inner pulley half 194 being slidable along the sheave shaft 196 to vary the sheave assembly drive ratio. The driving belt 38 is reeved about the driving pulley 30 and the upper one of the sheave assembly pulley grooves 198, and a driven belt 54 is reeved about the lower sheave assembly pulley groove 198 and a driven pulley 56 for subsequent power transmission to a transaxle assembly 60. The upper and lower ends of the sheave shaft 196 abuttingly engage the cam profile 200 of a pair of vertically spaced cam arms 202 extending generally transversely in parallel across the vehicle. These cam arms 202 are connected together at one end and are pivotally mounted with respect to the frame by a vertically extending pivot pin 204. The opposite ends of the cam arms 202 are interconnected by a bracket 66 having a pin 70 carried in a generally longitudinal slot 72 in the frame 14. Cam springs 68 interconnect the bracket 66 with the frame in a manner to bias the cam arms 202 for rotation forwardly and generally away from the driving and driven pulleys 30 and 56 for maintaining the V-belts 38 and 54 under driving tension.

A mechanical control linkage is provided for shifting the position of the sheave assembly along the cam profile 200 of the cam arms 202. The control linkage comprises a pair of first links 203 pivotally connected respectively by bolts 205 to opposite ends of the sheave shaft 196. The first links 203 have their opposite ends pivotally connected by connecting bolt 207 to a forwardly extending, generally triangularly-shaped plate 208. One side of the front end of said plate 208 is pivotally connected to the vehicle frame by a connecting bolt 210. The other side of the plate front end is pivotally connected to a forwardly extending control link 80 which, in turn, is coupled to a crank arm 82, a rockshaft 84, and the accelerator pedal 24. Importantly, the first links 203 and the plate 208 have lengths such that the angle between said links and plate is always less than 180°. Thus, when the accelerator pedal 24 is depressed, the plate 208 rotates clockwise about its pivot pin 210 as viewed in FIG. 15 to throw the sheave assembly 190 along the cam profile 200 to vary the sheave assembly drive ratio.

As shown in FIG. 15, the cam profile 200 includes a hooked portion 206 adjacent the cam arm pivot pin 204 extending generally toward the axial centers of the driving and driven pulleys 30 and 56 to allow the two V-belts 38 and 54 to drivingly disengage their respective pulleys and the sheave assembly. In this double declutched stopped position, the stop pin 70 at the opposite end of the cam arms 202 is urged by the cam springs 68 into engagement with the forwardmost end of the frame slot 72. A spring 182 is conveniently connected between the upper end of the control linkage crank arm 82 and the frame to provide dead man control by urging the sheave assembly into the stopped position.

As the accelerator pedal 24 is depressed by the vehicle operator, the sheave assembly is moved away from the hook portion 206 of the cam profile 200 and generally away from the axial centers of the pulleys 30 and 56. This gradually and simultaneously engages both V-belts 38 and 54 with their respective pulleys and the sheave assembly 190. Importantly, in this condition, the sheave assembly 190 is relatively close to the driving pulley 30 and relatively far from the driven pulley 56 so that the sheave assembly is in a low speed operating condition. The operating tension on the V-belts 38 and 54 stretches the cam springs 68 a short distance to pull the stop pin 70 away from the forwardmost end of the frame slot 72 whereby belt tension forces are related to and offset by the cam spring forces.

Further depression of the accelerator pedal moves the sheave assembly further along the cam profile 200 of the cam arms 202 toward the dotted line position shown in FIG. 15. Such movement carries the sheave assembly generally away from the axial center of the driving pulley 30 and generally toward the axial center of the driven pulley 56 to alter the drive ratio to a high speed operating condition. Again, as operating speed is increased, the cam springs 68 are stretched further as indicated by the dotted line position in FIG. 15 whereby the magnitude of the forces applied to the cam arms 202 by the cam springs 68 increases. Accordingly, the cam spring forces cause belt tension to increase with increases in operating speed to meet the higher horsepower requirements of the vehicle. This is consistent with design criteria for maximum belt life.

Still another embodiment of the variable speed drive of this invention is shown in FIGS. 16-20. This embodiment of the invention is for use with a front engine tractor or lawn mower 230 as viewed in FIG. 16. The vehicle 230 has a gasoline powered motor (not shown) housed generally over the front wheels 232 within a hood 234. A steering wheel 236 is provided at the rear of the hood 234, and is controllable by an operator for whom a seat 238 is provided generally over rear wheels 240 for the vehicle. A lawn mowing assembly 242 is carried on the vehicle frame near the ground generally between the front and rear wheels 232 and 240. Alternately, other commonly available power driven attachment implements are usable with the vehicle.

The variable speed drive for the vehicle 230 is shown in detail in FIGS. 17-20. As shown, a horizontally rotatable driving pulley 246 is fixed to the lower end of a vertically extending shaft 248. The shaft 248 is rotatably driven by the driving motor (not shown) fixed to the upper end of the shaft and to a frame 250 for the vehicle. The shaft 248 and the driving pulley are thus rotatable by the motor at a rate of speed according to motor speed.

A driving belt 252 is reeved about the driving pulley 246, and also about a double pulley, variable speed sheave assembly 254. The sheave assembly 254 is generally of the same construction as the sheave assembly shown in FIG. 4, and has an upper pulley groove 258 for receiving the driving belt 252. The sheave assembly also has a lower pulley groove 260 about which is reeved a driven belt 262, and the driven belt 262 is in turn reeved about a driven pulley 264. The driven pulley 264 is rotatable about a vertical shaft 266 coupled to a transaxle assembly 268 corresponding to that described in previous embodiments, and which couples rotational motion of the driven pulley 264 to the rear axles 270 to drive the rear wheels 240 of the vehicle.

The driven pulley 264 is disposed adjacent the rear wheels of the vehicle, with the sheave assembly 254 being positioned generally between the driving and driven pulleys 246 and 264. The sheave assembly has rotatable outer halves 272 carried on a vertical shaft, and a rotatable inner section 274 carried between the outer halves. The inner section 274 is slidable between the outer halves to inversely alter the effective diameters of the pulley grooves 258 and 260. The outer pulley halves 272 of the sheave assembly 254 have axially outwardly extending shoulders identical to the shoulders 61 shown in FIG. 4, and these shoulders are received in cam slots 278 formed in parallel horizontally extending cam plates 280 above and below the sheave assembly. More specifically, a pair of identical generally triangular-shaped cam plates 280 are joined together forwardly of the sheave assembly 254 by a pivot pin 282 fixed to the frame 250 of the vehicle. The cam plates 280 extend rearwardly from the pivot pin 282 and have identical generally L-shaped slots 278 for abuttingly receiving the shoulders of the sheave assembly pulley halves 272. The slots 278 extend generally transversely across the vehicle, and then together extend rearwardly away from the driving pulley 246.

The sheave assembly 254 is constrained for movement along the cam slots 278 by end plates 284 fixed to opposite ends of the sheave shaft by bolts 286. The sheave assembly 254 is controllably moved along the cam slots 278 by a pair of pusher plates 288 in abutting engagement with the shoulders on the outer pulley halves 272. More specifically, a vertically extending bolt 290 connects together the two cam plates 280 at a point generally opposite the pivot pin 282. the bolt 290 also serves to pivotally connect the pusher plates 288 to the cam plates 280. Each pusher plate 288 extends forwardly from the bolt 290, and terminates in a generally laterally projecting pusher arm 291 abuttingly engaging the shoulder of the adjacent outer pulley half 272. Importantly, a spring 294 is connected under tension between each sheave assembly end plate 284 and a tab 296 on the adjacent pusher plate 288 to thereby urge the pusher plates 288 into abutting contact with the sheave assembly at all times.

A mechanical control linkage is provided for enabling the vehicle operator to selectively control the position of the sheave assembly 254 along the cam slots 278. The control linkage comprises a control arm 300 connected to a bolt 302 interconnecting the two pusher plates 280 at a point generally laterally outwardly of the cam plate bolt 290. The arm 300 extends forwardly for connection in any suitable manner (not shown) to an accelerator pedal 304 operable by the vehicle operator. When the operator pushes forwardly on the pedal 304 in the direction of arrow 306, the pusher plates 288 pivot counterclockwise as viewed in FIGS. 17, 19, and 20. Such pivoting movement urges the sheave assembly 254 to move along the cam slots 278 first generally laterally, and then rearwardly to adjust the drive ratio of the sheave assembly, as will be hereafter described in more detail. Importantly, regardless of the position of the sheave assembly, springs 308 are connected between the pusher plates 288 and a pin 310 depending from the frame 250 to return the pedal and the pusher plates to their initial positions in the event pressure on the pedal is released by the operator. The springs 294 connected between the pusher plates and the sheave assembly correspondingly urge the sheave assembly to return to its original position.

The cam slots 278 are carefully configured to guide the sheave assembly from a stopped position with both belts 252 and 262 drivingly disengaged to a range of low to high speed drive ratios with both belts drivingly engaged. In the initial position shown in FIG. 17, the sheave assembly is positioned with respect to the driving and driven pulleys 246 and 264 such that both belts are drivingly disengaged. Lateral movement of the sheave assembly 254 along the cam slots 278 moves the sheave assembly generally away from both the driving pulley 246 and the driven pulley 264 so that the two belts 252 and 262 become drivingly engaged substantially simultaneously. This places the sheave assembly in a low speed drive ratio as shown in FIG. 19. Further movement of the sheave assembly 254 along the cam slots 278 moves the sheave assembly generally away from the driving pulley 246 and toward the driven pulley 264 to increase the sheave assembly drive ratio, and thereby move the sheave assembly toward a high speed operating position as shown in FIG. 20. Of course, whenever pressure on the accelerator pedal 304 is released by the operator, the springs 308 provide dead man control by urging the entire drive system back toward the stopped, double declutched position shown in FIG. 17.

The cam plates 280 are movably mounted with respect to the vehicle frame in order to account for stretching of the belts 252 and 262, as occurs during normal use. The cam plates 280 are pivotally movable about the axis of the pivot pin 282, and are thereby swingable laterally with respect to the frame. A pair of springs 312 are connected under tension between the cam plates 280 and a stop pin 314 depending from the frame to bias the cam plates generally away from the driving and driven pulleys 246 and 264. With this construction, the springs 312 urge the sheave assembly 254 away from the driving and driven pulleys throughout the range of low to high speed operating positions to maintain the belts 252 and 262 under driving tension. When the sheave assembly is in the stopped position shown in FIG. 17, swinging movement of the cam plates 280 is limited by a stop pin 316 depending from the frame 250 to prevent driving engagement of either belt. However, when the sheave assembly 254 is in the range of low to high speed positions shown in FIGS. 19 and 20, driving tension forces on the belts act against the forces applied by the springs 312 to the cam plates 280 so that the cam plates are pulled away from the stop pin 316. Accordingly, driving tension forces on the belts are governed by the forces applied to the cam plates 280 by the springs 312.

The mechanical configuration of the cam plates 280 is such that forces applied to cam plates by the springs 312 vary with respect to variations in operating speed. More specifically, the cam springs 312 are minimally stretched when the sheave assembly 254 is in the low speed operating condition as shown in FIG. 19 whereby belt tension is also at a minimum. As the sheave assembly is moved toward the high speed operating condition shown in FIG. 20, the cam springs 312 stretch further to increase the magnitude of the spring forces. Accordingly, belt tension correspondingly increases with increases in operating speed. This variation in belt tension is consistent with design criteria for maximum belt operating life.

I claim:

1. A variable speed drive comprising a frame; a driving pulley and a driven pulley each rotatably mounted with respect to said frame; a double pulley variable speed sheave assembly; a first belt reeved about said driving pulley and sheave assembly; a second belt reeved about said driven pulley and sheave assembly; a cam arm having a cam surface; means for movably mounting said cam arm with respect to said frame; means for moving said sheave assembly along said cam surface to alter the drive ratio of said sheave assembly through a range of low to high speed operating positions with said first and second belts under driving tension; and biasing means for biasing said sheave assembly generally away from said driving and driven pulleys.

2. A variable speed drive as set forth in claim 1 including cam follower means for constraining said sheave assembly for movement along said cam surface, said cam follower means being in engagement with the cam surface.

3. A variable speed drive as set forth in claim 1 wherein said biasing means is coupled to said sheave assembly for variably biasing said sheave assembly in accordance with variation in operating speed.

4. A variable speed drive as set forth in claim 1 wherein said mounting means comprises a pivot means connected between one end of said cam arm and said frame for allowing pivoting movement of said cam arm generally toward and away from said driving and driven pulleys, and said biasing means comprises a spring connected to the other end of said cam arm for springably biasing said cam arm away from said driving and driven pulleys for varying driving tension forces on said first and second belts in accordance with variations in operating speed.

5. A variable speed drive as set forth in claim 1 wherein the cam surface formed on said cam arm includes a first portion extending generally toward said driving and driven pulleys, and a second portion formed generally arcuately with respect to said driving and driven pulleys and extending from said first portion generally toward said driven pulley and away from said driving pulley, said moving means being for moving said sheave assembly between a stopped position along said first portion with said first and second belts drivingly disengaged to a range of low to high speed operating positions along said second portion, with both of said first and second belts under driving tension.

6. A variable speed drive as set forth in claim 5 wherein said moving means includes dead man control means for biasing said sheave assembly toward said stopped position.

7. A variable speed drive as set forth in claim 6 wherein said dead man control means comprises a spring.

8. A variable speed drive as set forth in claim 1 wherein the cam surface formed on said cam arm includes a stop for preventing movement of said sheave assembly beyond a predetermined high speed operating position.

9. A variable speed drive as set forth in claim 1 including cam follower means connected to said sheave assembly and in abutting engagement with the cam surface, and said moving means comprises a control plate, means for pivotally mounting said control plate on said frame for pivotal movement of one end into abutting engagement with said cam follower, and a control linkage connected to said control plate and operable for pivotally moving said plate against said cam follower means for moving said sheave assembly along the cam surface.

10. A variable speed drive as set forth in claim 9 wherein the cam surface formed on said cam arm includes a first portion extending generally toward said driving and driven pulleys, and a second portion formed generally arcuately with respect to said driving and driven pulleys and extending from said first portion generally toward said driven pulley and away from said driving pulley, said control linkage being manually operable for pivotally moving said control plate against said cam follower means on said sheave assembly for moving said sheave assembly from said stopped position to a low speed operating position, and further through said range of operating positions to said high speed operating position, said moving means including dead man control means for biasing said sheave assembly toward said stopped position.

11. A variable speed drive as set forth in claim 1 wherein said moving means comprises a control plate movably mounted on said frame and a control linkage connected to said control plate for pivotally moving said control plate with respect to said frame, said sheave assembly being mounted on said control plate, and including a cam follower mounted on said control plate in abutting engagement with the cam surface for guiding said sheave assembly with respect to the cam surface upon pivoting movement of said control plate.

12. A variable speed drive as set forth in claim 11 wherein the cam surface formed on said cam arm includes a first portion extending generally toward said driving and driven pulleys, and a second portion formed generally arcuately with respect to said driving and driven pulleys and extending from said first portion generally toward said driven pulley and away from said driven pulley, said control linkage being manually operable for moving said sheave assembly from said stopped position to a low speed operating position, and further through said range of operating positions to said high speed operating position, said moving means including dead man control means for biasing said sheave assembly toward said stopped position.

13. A variable speed drive as set forth in claim 1 including a cam follower on said sheave assembly in abutting engagement with the cam surface formed on said cam arm, said moving means comprising a control plate pivotally mounted on said frame, a connecting link pivotally connected between said sheave assembly and said control plate, and a control linkage connected to said control plate and operable for pivotally moving said control plate with respect to said frame for moving said sheave assembly along said cam surface.

14. A variable speed drive as set forth in claim 13 wherein the cam surface formed on said cam arm includes a first portion extending generally toward said driving and driven pulleys, and a second portion formed generally arcuately with respect to said driving and driven pulleys and extending from said first portion generally toward said driven pulley and away from said driving pulley, said control linkage being manually operable for pivotally moving said sheave assembly from said stopped position to a low speed operating position, and further through said range of operating positions to said high speed operating position, said moving means including dead man control means for biasing said sheave assembly toward said stopped position.

15. A variable speed drive as set forth in claim 1 wherein said moving means comprises a control plate pivotally mounted with respect to said frame and in abutting engagement with said sheave assembly, means for maintaining said control plate in abutting engagement with said sheave assembly, and a control linkage connected to said control plate and operable for pivotally moving said control plate with respect to said frame for moving said sheave assembly along said cam surface.

16. A variable speed drive as set forth in claim 15 wherein the cam surface formed on said cam arm includes a first portion extending generally toward said driving and driven pulleys, and a second portion formed generally arcuately with respect to said driving and driven pulleys and extending from said first portion generally toward said driven pulley and away from said driving pulley, said control linkage being manually operable for moving said sheave assembly from said stopped position to a low speed operating position, and further through said range of operating positions to said high speed operating position, said moving means including dead man control means for biasing said sheave assembly toward said stopped position.

17. A variable speed drive as set forth in claim 15 wherein said cam arm is pivotally mounted on said frame, and said control plate is pivotally mounted on said cam arm.

18. A variable speed drive as set forth in claim 15 wherein said means for maintaining said control plate in abutting engagement with said sheave assembly comprises a spring connected between said control plate and said sheave assembly.

19. A variable speed drive as set forth in claim 1 including a combination transmission-differential assembly mounted on said frame and connected to at least one axle, said driven pulley being connected to said combination transmission-differential assembly to impart rotational motion of said driven pulley to said one axle.

20. A variable speed drive comprising a frame; a driving pulley and a driven pulley each rotatably mounted with respect to said frame; a double pulley variable speed sheave assembly; a first belt reeved about said driving pulley and sheave assembly; a second belt reeved about said driven pulley and sheave assembly; a cam arm having a cam surface with first and second portions; means for pivotally mounting said cam arm on said frame; control means for controllably moving said sheave assembly along said cam surface to alter the sheave assembly drive ratio between a stopped position with said first and second belts drivingly disengaged when said sheave assembly is along the first portion of the cam surface to a range of low to high speed positions with said first and second belts under driving tension when said sheave assembly is along the second portion of the cam surface; and biasing means for biasing said sheave assembly generally away from said driving and driven pulleys.

21. A variable speed drive as set forth in claim 20 wherein said biasing means is coupled to said sheave assembly for variably biasing said sheave assembly in accordance with variations in operating speed.

22. A variable speed drive as set forth in claim 20 wherein said control means includes dead man control means for biasing said sheave assembly toward said stopped position.

23. A variable speed drive as set forth in claim 20 wherein said control means comprises a control plate pivotally mounted with respect to said frame and in abutting engagement with said sheave assembly, means for maintaining said control plate in abutting engagement with said sheave assembly, and a control linkage connected to said control plate and operable for pivotally moving said control plate with respect to said frame for moving said sheave assembly along said cam surface.

24. A variable speed drive as set forth in claim 23 wherein said control plate is pivotally mounted on said cam arm.

25. A variable speed drive as set forth in claim 20 wherein said biasing means is connected to said cam arm generally opposite said mounting means for biasing said sheave assembly generally away from said driving and driven pulleys for varying driving tension forces on said first and second belts in accordance with variations in operating speed.

26. A variable speed drive as set forth in claim 20 wherein the first portion of said cam surface extends generally toward said driving means and driven pulleys, and the second portion of said cam surface extends from said first portion generally arcuately with respect to said driving and driven pulleys toward said driven pulley and away from said driving pulley.

27. In a vehicle having a frame with a driving pulley, a driven pulley, and a double pulley variable speed sheave assembly respectively rotated mounted thereon, and first and second belts respectively reeved about said driving pulley and sheave assembly and said driven pulley and sheave assembly, the improvement comprising spring lever means having a cam surface; means for pivotally mounting said spring lever means on said frame; and means for moving said sheave assembly along the cam surface to alter the drive ratio of said sheave assembly, said spring lever means including means for biasing said sheave assembly generally away from said driving and driven pulleys to maintain said first and second belts under driving tension.

28. The invention of claim 27 wherein said spring lever means is coupled to said sheave assembly for variably biasing said sheave assembly in accordance with variations in operating speed.

29. The invention of claim 27 wherein said moving means comprises a control plate pivotally mounted with respect to said frame and in abutting engagement with said sheave assembly, means for maintaining said control plate in abutting engagement with said sheave assembly, and a control linkage connected to said control plate and operable for pivotally moving said control plate with respect to said frame for moving said sheave assembly along said cam surface.

30. The invention of claim 29 wherein said control plate is pivotally mounted on said spring lever means.

31. The invention of claim 27 wherein said biasing means is connected to said spring lever means generally opposite said moving means for biasing said driving and driven pulleys for varying driving tension forces in accordance with variations in operating speed.

32. The invention of claim 27 wherein the cam surface on said spring lever means includes a first portion extending generally toward said driving and driven pulleys, and a second portion formed generally arcuately with respect to said driving and driven pulleys and extending from said first portion generally toward said driven pulley and away from said driving pulley, said moving means being manually operable for moving said sheave assembly from said stopped position to a low speed operating position, and further through said range of operating positions to said high speed operating position, said moving means including dead man control means for biasing said sheave assembly toward said stopped position.

33. A variable speed drive comprising a frame; a driving pulley and a driven pulley each rotatably mounted with respect to said frame; a double pulley variable speed sheave assembly; a first belt reeved about said driving pulley and sheave assembly; a second belt reeved about said driven pulley and sheave assembly; a cam arm having a cam surface with first and second portions; means for pivotally mounting said cam arm on said frame; means for controllably moving said sheave assembly along said cam surface to alter the sheave assembly drive ratio between a stopped position with said first and second belts drivingly disengaged when said sheave assembly is along the first portion of the cam surface to a range of low to high speed positions with said first and second belts under driving tension when said sheave assembly is along the second portion of the cam surface, said moving means including dead man control means for biasing said sheave assembly toward said stopped position.

34. A variable speed drive as set forth in claim 33 including means for biasing said sheave assembly generally away from said driving and driven pulleys for varying driving tension forces on said first and second belts in accordance with variations in operating speed.

* * * * *

UNITED STATES PATENT OFFICE
CERTIFICATE OF CORRECTION

Patent No. 4,132,121      Dated January 2, 1979

Inventor(s) George C. Clarke

It is certified that error appears in the above-identified patent and that said Letters Patent are hereby corrected as shown below:

Column 2, line 42, change "amount" to --account--.

Column 10, line 3, change "uppe" to --upper--.

Column 15, line 32, (claim 4), delete "a".

Column 16, line 43, (claim 12), change "driven" to --driving--.

Column 18, line 27, (claim 26), delete "means";

line 34, (claim 27), change "rotated" to --rotatably--;

line 63, (claim 31), change "moving" to --mounting--.

Signed and Sealed this

Twenty-second Day of May 1979

[SEAL]

Attest:

RUTH C. MASON
*Attesting Officer*

DONALD W. BANNER
*Commissioner of Patents and Trademarks*